United States Patent
Wei et al.

(10) Patent No.: US 9,073,287 B2
(45) Date of Patent: Jul. 7, 2015

(54) ORGANIC/INORGANIC MULTI-LAYERED GAS BARRIER FILM

(75) Inventors: Hsiao-Fen Wei, Taipei County (TW); Liang-You Jiang, Taipei County (TW); Pao-Ming Tsai, Kaohsiung (TW); Jhen-Hao Jiang, Taoyuan County (TW)

(73) Assignee: Industrial Technology Research Insititute, Hsinchu (TW)

( * ) Notice: Subject to any disclaimer, the term of this patent is extended or adjusted under 35 U.S.C. 154(b) by 1302 days.

(21) Appl. No.: 12/618,792

(22) Filed: Nov. 16, 2009

(65) Prior Publication Data

US 2010/0151209 A1 Jun. 17, 2010

Related U.S. Application Data

(60) Provisional application No. 61/122,414, filed on Dec. 15, 2008.

(51) Int. Cl.
| | | |
|---|---|---|
| *B32B 3/02* | (2006.01) | |
| *B32B 9/00* | (2006.01) | |
| *B32B 3/00* | (2006.01) | |
| *B05D 1/36* | (2006.01) | |
| *B05D 1/40* | (2006.01) | |
| *B32B 3/10* | (2006.01) | |
| *B32B 7/00* | (2006.01) | |
| *B32B 7/04* | (2006.01) | |
| *B32B 3/26* | (2006.01) | |
| *C08J 7/04* | (2006.01) | |

(52) U.S. Cl.
CPC ............ *B32B 3/10* (2013.01); *Y10T 428/24752* (2015.01); *Y10T 428/24851* (2015.01); *B32B 2307/7242* (2013.01); *B32B 7/005* (2013.01); *B32B 7/045* (2013.01); *B32B 3/263* (2013.01); *C08J 7/04* (2013.01); *C08J 2379/08* (2013.01); *C08J 2427/00* (2013.01)

(58) Field of Classification Search
CPC ...... C08J 7/04; B32B 2307/7242; B32B 3/10; B32B 3/263; B32B 7/005; B32B 7/045
See application file for complete search history.

(56) References Cited

U.S. PATENT DOCUMENTS

| 7,282,254 B1 | 10/2007 | Cho et al. |
| 7,291,397 B2 | 11/2007 | Miyadera et al. |

(Continued)

FOREIGN PATENT DOCUMENTS

| TW | 200711833 | 4/2007 |
| TW | 200830620 | 7/2008 |

(Continued)

OTHER PUBLICATIONS

Hyungsuk Lee, et al., "Inorganic-Organic Barrier Coatings for Flexible OLED Applications", IEEE, Flexible Electronics and Displays Conference and Exhibition, Jan. 2008, pp. 1-7.
"Office Action of Taiwan Counterpart Application," issued on Apr. 14, 2015, p. 1-p. 5, in which the listed references were cited.

*Primary Examiner* — Gerard Higgins
*Assistant Examiner* — Sathavaram I Reddy
(74) *Attorney, Agent, or Firm* — Jianq Chyun IP Office (57) ABSTRACT

The present invention employs the totally printable process to fabricate an organic/inorganic multi-layered laminate gas barrier film. Such totally printable process is simple with lower costs. Moreover, through the pattern design, the adhesion between the organic and inorganic layers is improved.

10 Claims, 6 Drawing Sheets

(56) References Cited

U.S. PATENT DOCUMENTS

| | | | |
|---|---|---|---|
| 2003/0203210 A1 | 10/2003 | Graff et al. | |
| 2004/0053070 A1* | 3/2004 | Sawai et al. | 428/690 |
| 2005/0079380 A1* | 4/2005 | Iwanaga | 428/688 |
| 2005/0095422 A1* | 5/2005 | Sager et al. | 428/336 |
| 2005/0175831 A1* | 8/2005 | Kim et al. | 428/323 |
| 2007/0196682 A1* | 8/2007 | Visser et al. | 428/594 |

FOREIGN PATENT DOCUMENTS

| | | |
|---|---|---|
| TW | 200840708 | 10/2008 |
| WO | 2008/094352 | 8/2008 |

\* cited by examiner

ORGANIC/INORGANIC MULTI-LAYERED GAS BARRIER FILM

CROSS-REFERENCE TO RELATED APPLICATION

This application claims the priority benefit of U.S. Provisional Application Ser. No. 61/122,414, filed on Dec. 15, 2008. The entirety of the above-mentioned patent application is hereby incorporated by reference herein and made a part of this specification.

BACKGROUND OF THE INVENTION

1. Field of the Invention

The present invention generally relates to a barrier film and a manufacturing method thereof. More particularly, the present invention relates to an organic/inorganic multi-layered gas barrier film and a manufacturing method thereof.

2. Description of Related Art

As the flexible substrates afford better pliability and design freedom, the flexible display panels become popular and thus quickly replace the rigid display panels. Compared with the rigid substrates, the flexible plastic substrates are cheaper, compatible with workability and safety requirements and suitable for display medium and roll-to-roll processes. However, certain drawbacks exist, including low temperature and chemical resistance, high permeability to oxygen and water vapour and large thermal expansion coefficients. A typical flexible plastic substrate has water permeation of 100~10 $g/m^2/day$ (at 25° C.), which is unable to completely prevent water vapour and oxygen permeation, and thus leads to device impairment. In order to avoid water vapour and oxygen permeation, specific material is coated between the plastic substrate and the electronic devices. Such tight-sealing barrier material has to be defect-free and pinhole-free when formed as a membrane or a film, and highly transparent or no absorption to visible light. Such material may be formed as a single-layered or multilayered laminate film for gas barrier purposes.

Flexible gas barrier films include inorganic layers (of metal oxides, metal nitrides or metal oxynitrides) and organic layers. The inorganic layers provide better gas barrier capability, while the organic layers can help maintain the flexibility of the barrier film. However, conventional gas barrier structures are mainly fabricated by alternatively laminating organic/inorganic films, but the adhesion between the organic material and the inorganic material is poor. If further treatment is performed to the surface(s) of the organic or inorganic layers for improving the adhesion there-between, the production cost will be increased. Also, certain defects, such as pinholes, exist in the barrier films fabricated by the vacuum processes and cause the permeation of the oxygen and water vapour, leading to degradation of the electronic device and shorter life time. Further shortcomings include high-priced apparatus or systems for the vacuum processes, low yields and difficulties in fabrication of large-sized substrates.

SUMMARY OF THE INVENTION

The present invention is directed to a manufacturing process for forming a multi-layered gas barrier laminate film.

The present invention provides a totally printable process for forming a multi-layered gas barrier laminate film by alternately forming the organic layers and the inorganic layers, which may help reduce the formation of pinholes.

The present invention provides a multi-layered gas barrier laminate film, comprising a flexible substrate, a plurality of organic layers disposed over the flexible substrate and a plurality of inorganic layers disposed over the flexible substrate. The organic layers and the inorganic layers are stacked in alternation, and the inorganic layers are interconnected with one another.

According to the embodiments of the present invention, each of the plurality of organic layers has a pattern, and the patterns of the most adjacent two organic layers are off-set or not aligned. In this case, due to the off-set pattern designs, the inorganic material within the barrier film is three-dimensionally interconnected, and the organic material is sandwiched between the inorganic material, which may improve the flexibility of the barrier film and avoid possible cracking of the barrier film.

In order to make the above and other features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the descriptions to refer to the same or like parts.

Figure 1A:
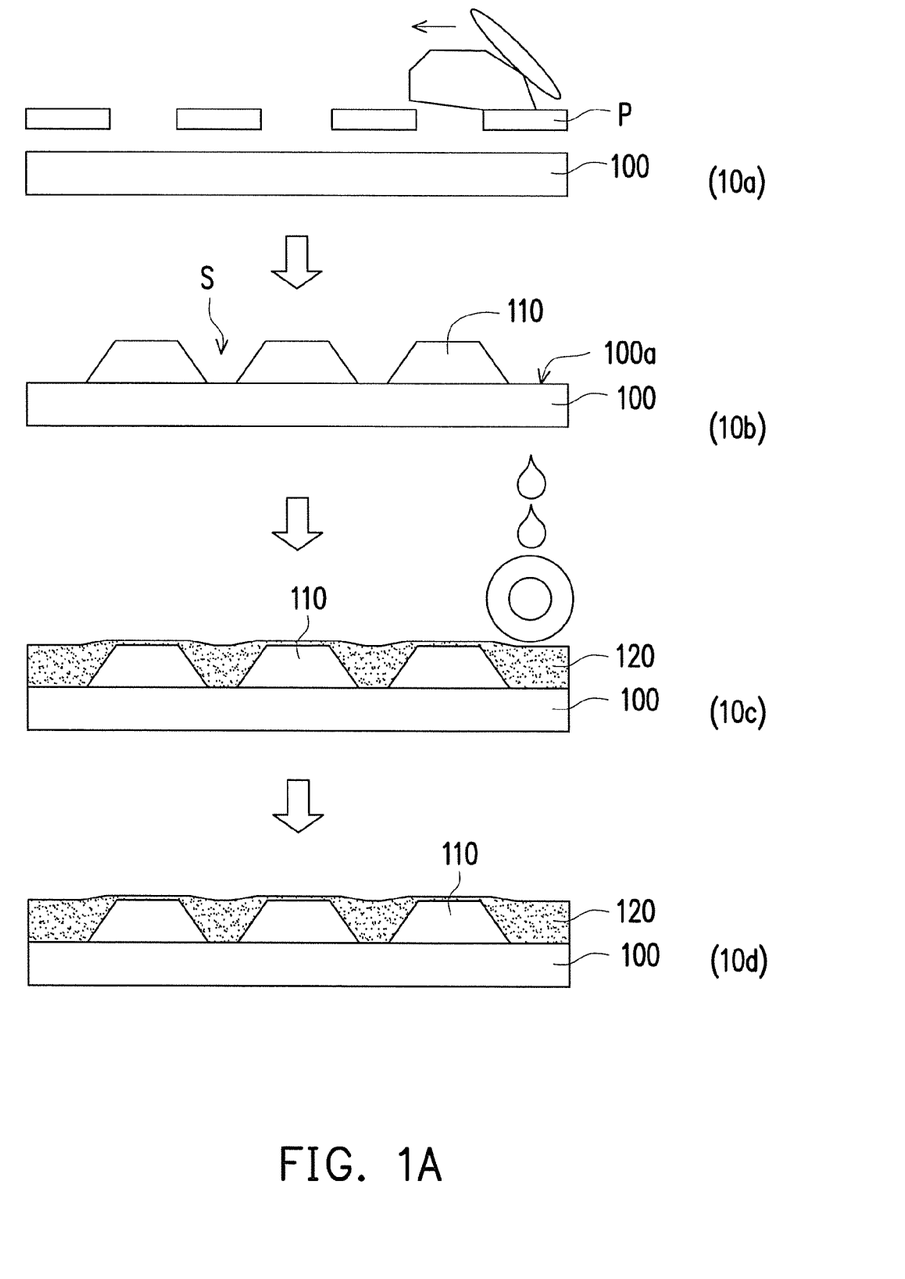
FIGS. 1A-1C describe the exemplary processes of forming an organic layer and then an inorganic layer for a barrier film according to the present invention.
Figure 1B:
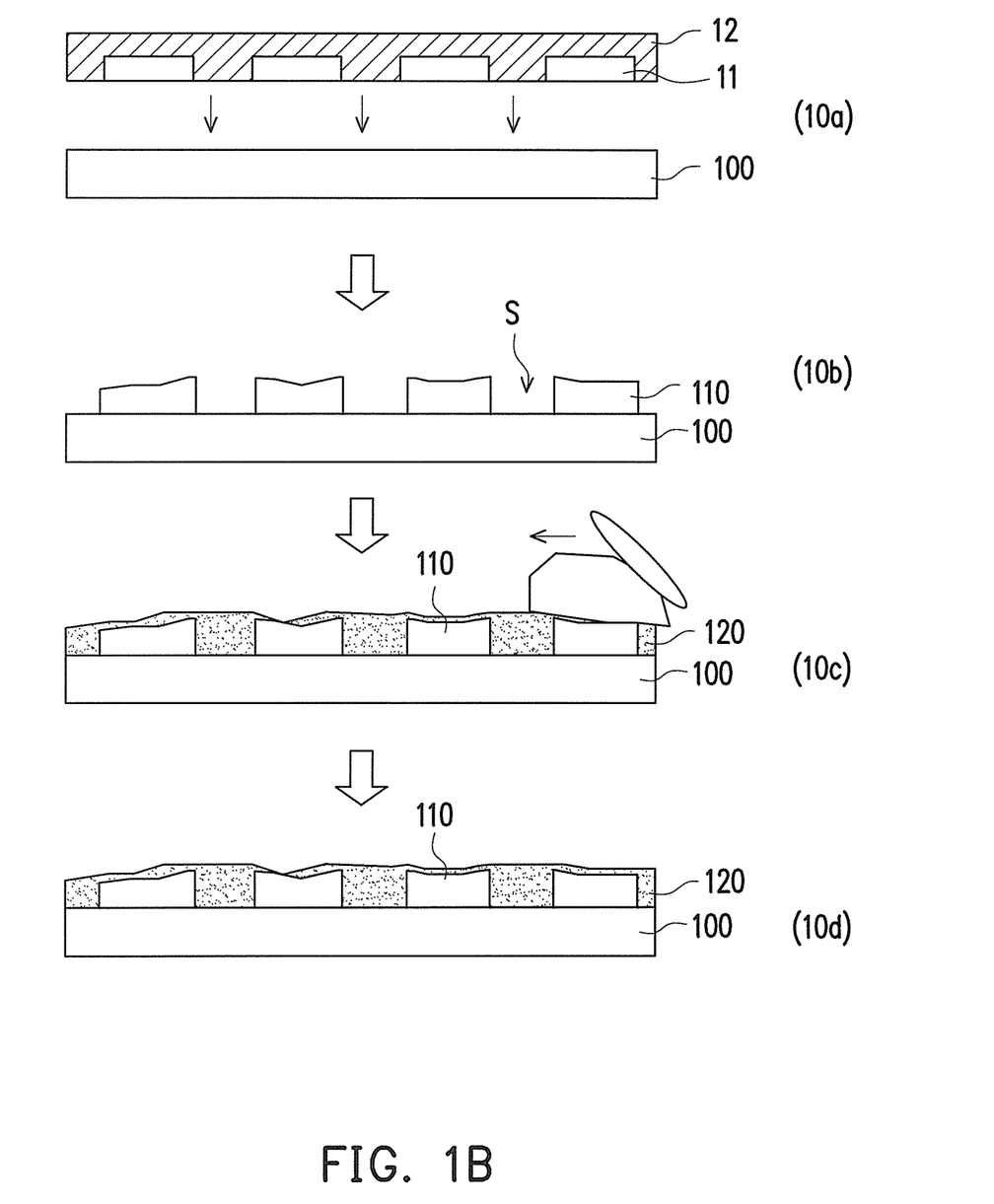
Figure 1C:
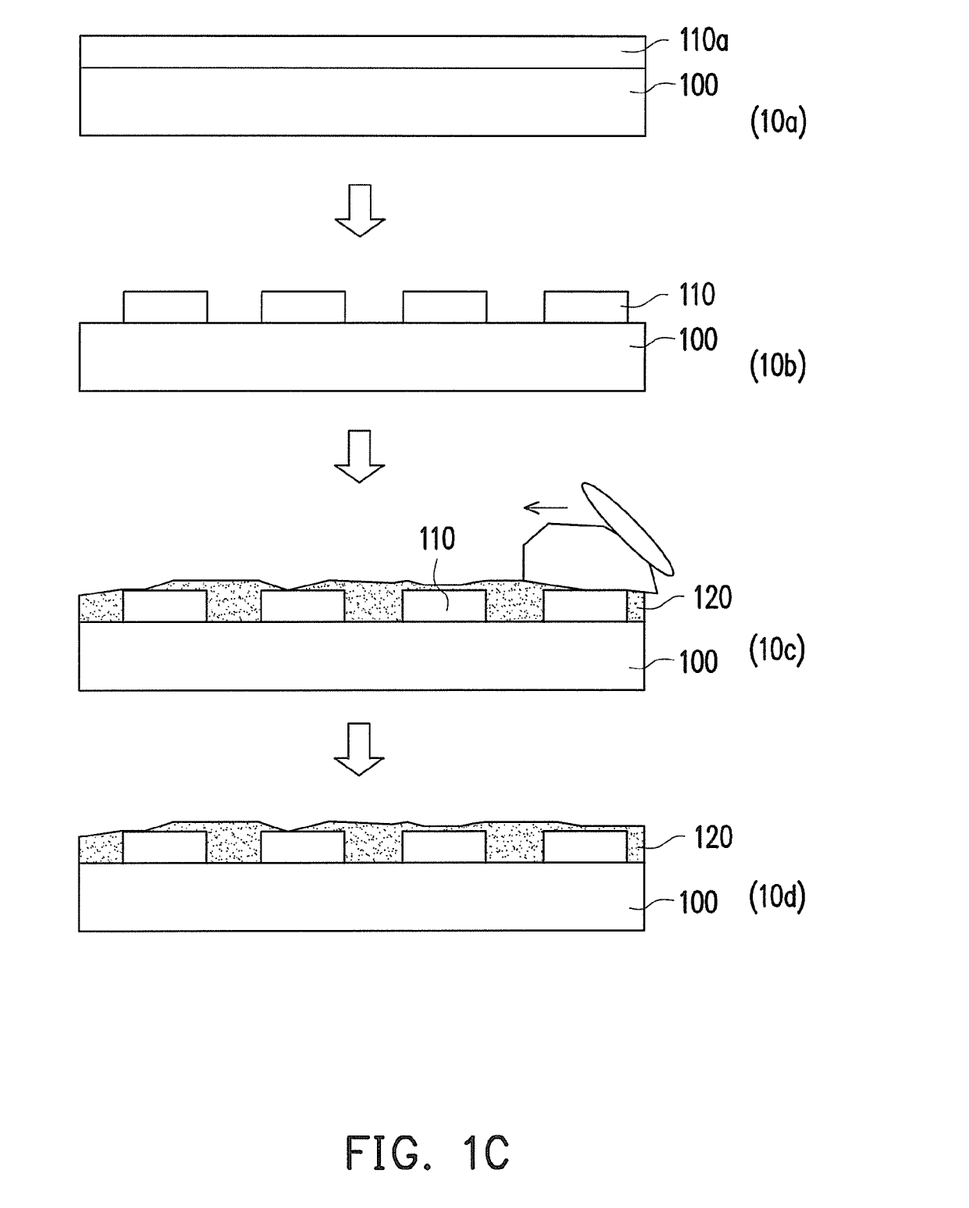

FIGS. 1A-1C describe the exemplary processes of forming an organic layer and then an inorganic layer for a barrier film according to the present invention. Following the process flow of FIG. 1A, a plastic substrate 100 is provided (Step 10a). Later, with the screen plate P, a patterned organic layer 110 (with a pattern defined by the openings S) is coated on the surface 100a of the plastic substrate 100 (Step 10b) by screen printing, for example. Subsequently an inorganic layer 120 is coated to the patterned organic layer 110, filling up the openings S of the patterned organic layer 110 and covering the entire surface of the patterned organic layer 110 (Step 10c), by roller printing, for example. Afterwards, a drying step (Step 10d) is performed to dry up the inorganic layer 120. The drying step may include a UV-dried step, a thermal-dried step, an air-dried step and/or an electron-beam irradiation step. Such process flow may be repeated several times to form several organic layers and several inorganic layers laminated in alternation, depending on the gas barrier capability required by the products in process.

Following the process flow of FIG. 1B, a plastic substrate 100 is provided and an organic material 11 is provided to a template 12 with a pattern (Step 10a). Later, a patterned organic layer 110 is formed on the plastic substrate 100 after transferring the organic material 11 from the template 12 to the plastic substrate 100 by micro-imprinting (micro-stamping), for example (Step 10b). Subsequently an inorganic layer 120 is coated to the patterned organic layer 110, filling up the openings S of the patterned organic layer 110 and covering the entire surface of the patterned organic layer 110 (Step 10c), by doctor blade coating or squeegee printing, for example. Afterwards, a drying step (Step 10d) is performed to dry up the inorganic layer 120. The drying step may include a UV-dried step, a thermal-dried step, an air-dried step and/or an electron-bean irradiation step. Such process flow may be repeated several times to form several organic layers and several inorganic layers laminated in alternation, depending on the gas barrier capability required by the products in process.

Following the process flow of FIG. 1C, a plastic substrate 100 is provided and an organic layer 110a is formed on the plastic substrate 100 by, for example, spin coating (Step 10a). Later, the organic layer 110a is patterned by photolithography and wet-etching to form a patterned organic layer 110 on the plastic substrate 100 (Step 10b). Subsequently an inorganic layer 120 is coated to the patterned organic layer 110, filling up the openings S of the patterned organic layer 110 and covering the entire surface of the patterned organic layer 110 (Step 10c), by doctor blade coating or squeegee printing, for example. Afterwards, a drying step (Step 10d) is performed to dry up the inorganic layer 120. The drying step may include a UV-dried step, a thermal-dried step, an air-dried step and/or an electron-beam irradiation step. Such process flow may be repeated several times to form several organic layers and several inorganic layers laminated in alternation, depending on the gas barrier capability required by the products in process.

Preferably, either the organic layer or the inorganic layer of the present invention is formed by the so-called totally printable process. The totally printable process may include screen printing technology, doctor blade coating (without the screen plate), squeegee printing, roll coating, micro (or nano)-imprinting, spray printing, spin coating, flow coating, capillary coating, chemical coating and dip or immersion coating. Such totally printable process is simple, low-cost and is able to form a single layer with pattern (or without pattern) in one step. Due to the lamination of the organic layer(s) and the inorganic layer(s), the pinholes of the previously-formed layer may be greatly reduced or compensated by the fluidity of the later-formed layer.

The material of the plastic substrate may be polyethylene terephthalate (PET), polycarbonate (PC), polymethylmethacrylate (PMMA), polyvinylchloride (PVC), polyimide (PI) or polyethylene (PE), for example.

The organic materials suitable for the above processes may be macromolecules or polymers with low film-forming temperature and high light transparency, such as, optical grade polymethylmethacrylate (PMMA), poly-p-xylene, poly-p-xylene, ethylene-chlorotrifluoroethylene copolymer, fluorinated ethylene-propylene, fluorinated ethers, polytetrafluoroethene, polychlorotrifluoroethylene, polyimide precursors, self-assembly materials or light sensitive materials. The organic material may further include absorbent or desiccant additives, such as $NaBH_4$, $CaCl_2$, silica gel, and CaO. The organic material may further include nano-particles of aluminium oxide, zinc oxide or silver, for increasing the barrier capability.

The inorganic material suitable for the above process may be sol-gel materials of gas barrier capability, silicon oxide or metal oxides, such as titanium oxide, tin oxide, aluminium oxide or zinc oxide.

The organic material used for the organic layer may be the same or different between layers. Similarly, the inorganic material used for the inorganic layer may be the same or different between layers.

Figure 2A:
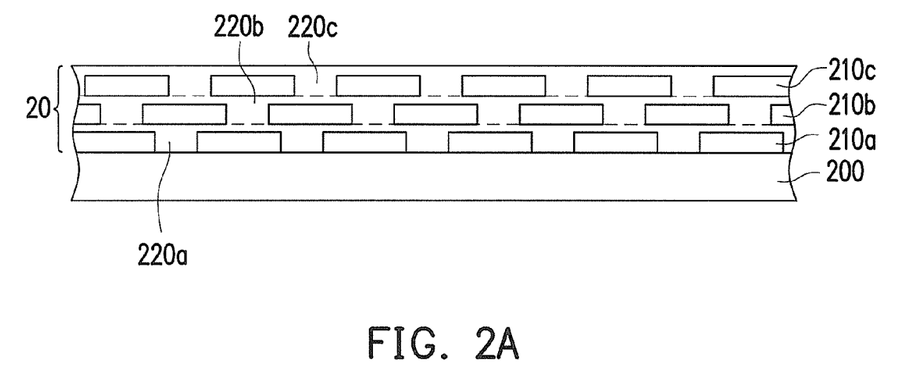
FIG. 2A is a schematic cross-sectional view illustrating the barrier film according to an embodiment of the present invention.
Figure 2B:
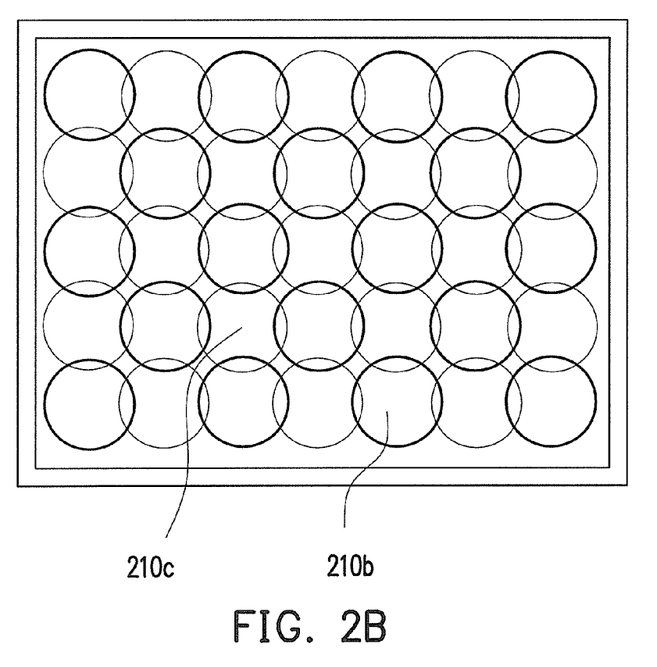
FIG. 2B is an exemplary top view of the barrier film according to an embodiment of the present invention.

FIG. 2A is a schematic cross-sectional view illustrating the barrier film according to an embodiment of the present invention, while FIG. 2B is an exemplary top view of the barrier film.

In FIG. 2A, three layers of patterned organic layers 210a, 210b and 210c and three layers of inorganic layers 220a, 220b and 220c are stacked in alternation and disposed on the substrate 200. Within the laminate film 20, the inorganic layers 220a/220b/220c are interconnected with one another and become a continuous matrix structure. Due to the patterned organic layer formed by the printing process, the inorganic materials within the laminate film are interconnected and become continuous throughout the organic and inorganic layers for better gas barrier efficiency. Hence, the adhesion between the organic and inorganic layers is increased and peeling between the organic and inorganic layers is decreased.

From FIG. 2B, the patterned organic layers 210a, 210b and 210c are shown as round blocks arranged in stagger. However, the shape or design of the pattern of the organic layer is not limited by the embodiments provided herein. Preferably, the patterns of the most adjacent two organic layers are staggered or complement to each other. At least, the patterns of the most two adjacent two organic layers are not aligned or are off-set. In this case, due to the off-set pattern designs, in the vertical direction of the barrier film, the inorganic material within the barrier film is not directly piled on each other, and the organic material is sandwiched between the inorganic material, which improves the flexibility of the barrier film and avoids possible cracking of the barrier film.

Macroscopically, the inorganic material within the laminate film may be considered as an interconnected matrix or web structure, while the unconnected organic material distributed within the continuous inorganic material may help enhance the pliability and flexibility of the laminate film.

Conventionally, in order to enhance gas barrier capability, the thickness of the inorganic layer needs to be increased or more inorganic layers are required. But the thicker the inorganic layer, the more fragile the inorganic layer is, when an outer force is applied. However, due to the off-set pattern arrangement between the layers, the thickness of the inorganic layers is not diametrically accumulated but the permeation pathway for water or oxygen gas may become meandering and be extended in this regard.

Figure 3A:
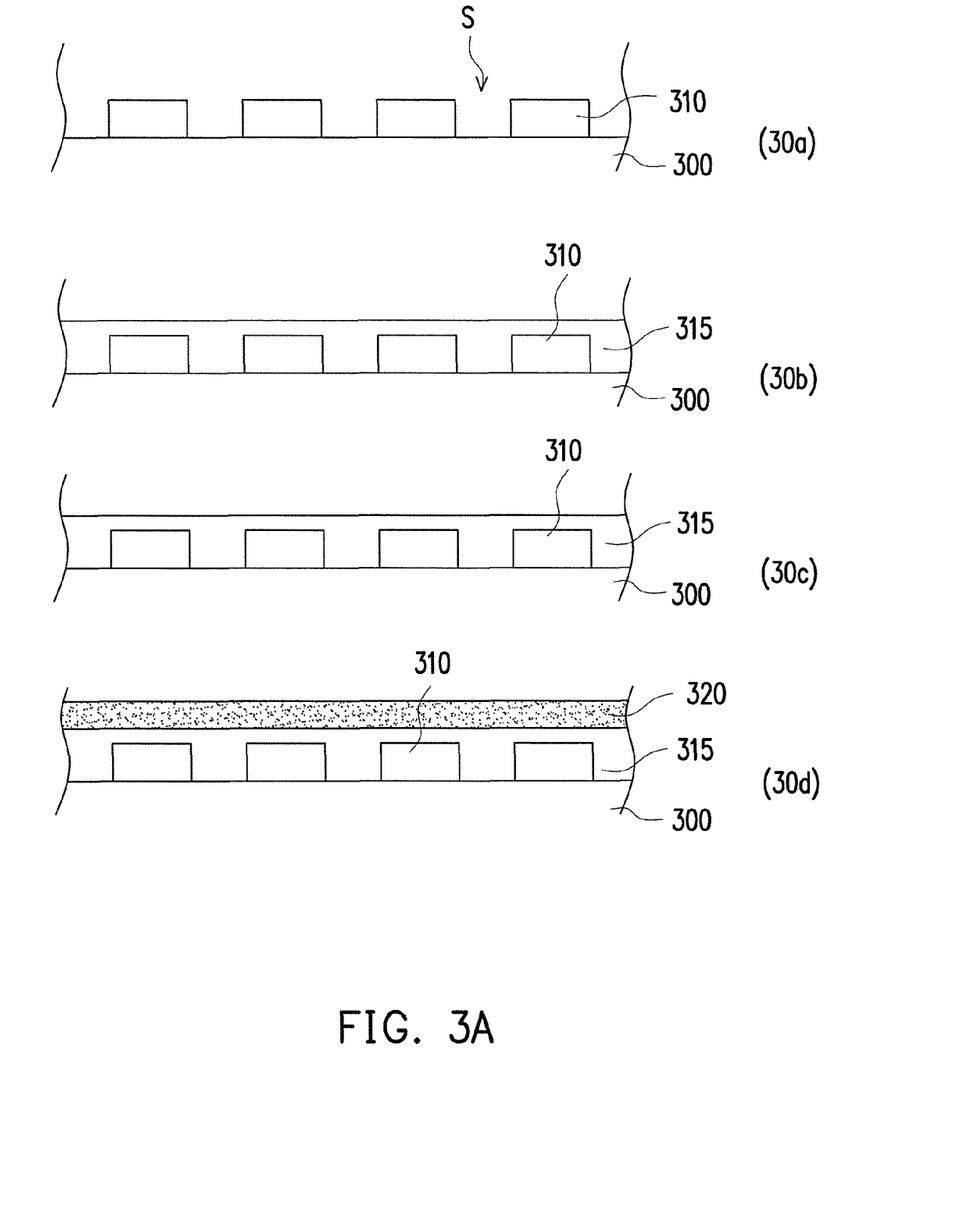
FIGS. 3A-3B describes the exemplary processes of aiming a mixture layer for a barrier film according to the present invention.
Figure 3B:
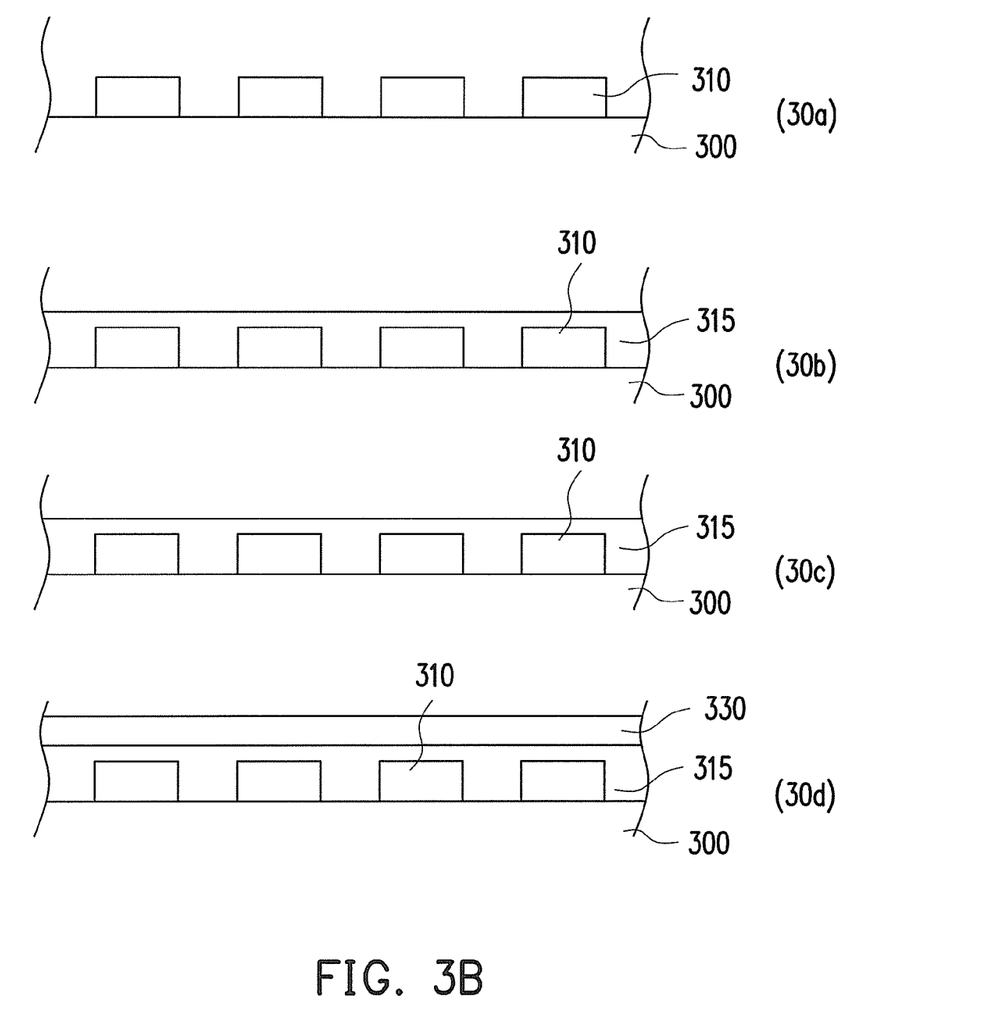

In addition to the exemplary processes of forming an organic layer and then an inorganic layer for the barrier film, an organic/inorganic hybrid layer may be formed after forming the organic layer and before forming the inorganic layer. FIGS. 3A-3B describe the exemplary processes of forming a mixture layer for a barrier film according to the present invention.

Following the process flow of FIG. 3A, a plastic substrate 300 is provided and a patterned organic layer 310 is formed on the plastic substrate 300 (Step 30a). Subsequently an organic/inorganic hybrid layer 315 is coated to the patterned organic layer 310, filling up the openings S of the patterned organic layer 310 and covering the entire surface of the patterned organic layer 310 (Step 30b), by slot-die coating, for example. Afterwards, a drying step (Step 30c) is performed to dry up the mixture layer 315. Later, an inorganic layer 320 is coated over the mixture layer 315 (Step 30d). Such process flow may be repeated several times to form the laminate film, depending on the gas barrier capability required by the products in process. The organic/inorganic hybrid layer may be selected from silicon-containing, titanium-containing or aluminium-containing hybrid materials, for example. The organic/inorganic hybrid layer may level the organic layers, and the organic/inorganic hybrid layer may have gas barrier capability.

Following the process flow of FIG. 3B, Steps 30a-30c are the same as described in FIG. 3A, while in Step 30d, another organic layer 330 is coated on the mixture layer 315.

EXAMPLE

Over a transparent polyimide (PI) substrate, an organic acrylate-based photoresist layer of about 1 micron thickness is spin coated to the PI substrate. After soft baking at 90° C., exposure energy 500 mJ/cm$^2$ and 220° C. hard baking, a transparent organic layer is obtained. Subsequently, a inorganic layer, made of silicon-containing sol-gel material (IC1-200), of about 300 nm thickness is spin coated over the patterned organic layer and then is dried at 100° C. for 10 minutes and 220° C. for 30 minutes to remove the solvent. Later, another organic acrylate-based photoresist layer of about 1 micron thickness is spin coated to the mixture layer. After soft baking at 90° C., exposure energy 500 mJ/cm$^2$ and 220° C. hard baking, another transparent organic layer is formed and the laminate film is obtained. Such gas barrier substrate has water vapour transmission rate (WVTR) value of $10^{-1}$ g/m$^2$/day under 25° C. and 60% relative humidity.

The process provided by the present invention preferably applies the totally printing process to fabricate the organic/inorganic multi-layered gas barrier film. As one printing step may achieve patterning and coating at the same time, the process may be simplified with lower costs. Through the pattern design (e.g. the off-set pattern) of the organic layer and the alternate or the complementary arrangement of the patterned organic layer and the adjacent inorganic layer, the inorganic material is interconnected between the layers and the vertical diffusion pathway of the gas is elongated, thus improving the gas barrier efficiency. In addition, the continuous inorganic material matrix alleviates the peeling between layers of different materials, further improving the adhesion between the organic and the inorganic layers.

By using the totally printable process, it may be easier to fabricate large sized gas barrier film for flexible substrates. Moreover, such process may improve the gas barrier capability and flexibility of the substrate for application in the flexible touch panel.

Compared with the commonly used vacuum process, the costs for either the applicable materials or the working apparatus/equipments of the present invention may be lower.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-layered gas barrier laminate film, comprising a flexible substrate, a plurality of organic layers disposed over the flexible substrate, a plurality of organic/inorganic hybrid layers and a plurality of inorganic layers disposed over the flexible substrate, wherein the plurality of organic layers, the plurality of organic/inorganic hybrid layers and the plurality of inorganic layers are stacked in a sequence of one organic layer, one organic/inorganic hybrid layer and one inorganic layer, each one of the plurality of organic layers has a pattern with openings, one of the plurality of organic/inorganic hybrid layers fills up the openings of the each one of the plurality of organic layers and fully covers a top surface of the each one of the plurality of organic layers and the plurality of organic/inorganic hybrid layers and the plurality of inorganic layers are interconnected with one another.

2. The multi-layered gas barrier laminate film of claim 1, wherein the pattern of each one of the plurality of organic layers is different from that of another one of the plurality of organic layers that is most adjacent thereto.

3. The multi-layered gas barrier laminate film of claim 1, wherein the pattern of each one of the plurality of organic layers is arranged off-set to that of another one of the plurality of organic layers that is most adjacent thereto.

4. The multi-layered gas barrier laminate film of claim 1, wherein a material of the plurality of organic layers is a macromolecule or a polymer material.

5. The multi-layered gas barrier laminate film of claim 4, wherein the material of the plurality of organic layers is optical grade polymethylmethacrylate, poly-p-xylene, ethylene-chlorotrifluoroethylene copolymers, fluorinated ethylene-propylene, fluorinated ether, polytetrafluoroethene, polychlorotrifluoroethylene, a polyimide precursor, a self-assembly material or a light sensitive material.

6. The multi-layered gas barrier laminate film of claim 1, wherein a material of the plurality of inorganic layers includes metal oxide or non-metal oxide.

7. The multi-layered gas barrier laminate film of claim 6, wherein the metal oxide is titanium oxide ($TiO_2$), tin oxide ($SnO_2$), aluminum oxide ($Al_2O_3$) or zinc oxide (ZnO), while the non-metal oxide is silicon oxide (SiO2).

8. The multi-layered gas barrier laminate film of claim 1, wherein a material of the flexible substrate is polyethylene terephthalate (PET), polycarbonate (PC), polymethylmethacrylate (PMMA), polyvinylchloride (PVC), polyimide (PI) or polyethylene (PE).

9. The multi-layered gas barrier laminate film of claim 1, wherein a material of the plurality of organic/inorganic hybrid layers is a silicon-containing hybrid material, a titanium-containing hybrid material or an aluminium-containing hybrid material.

10. The multi-layered gas barrier laminate film of claim 4, wherein the material of the plurality of organic layers further includes nano-particles of aluminium oxide, zinc oxide or silver.

* * * * *